Figure 1:
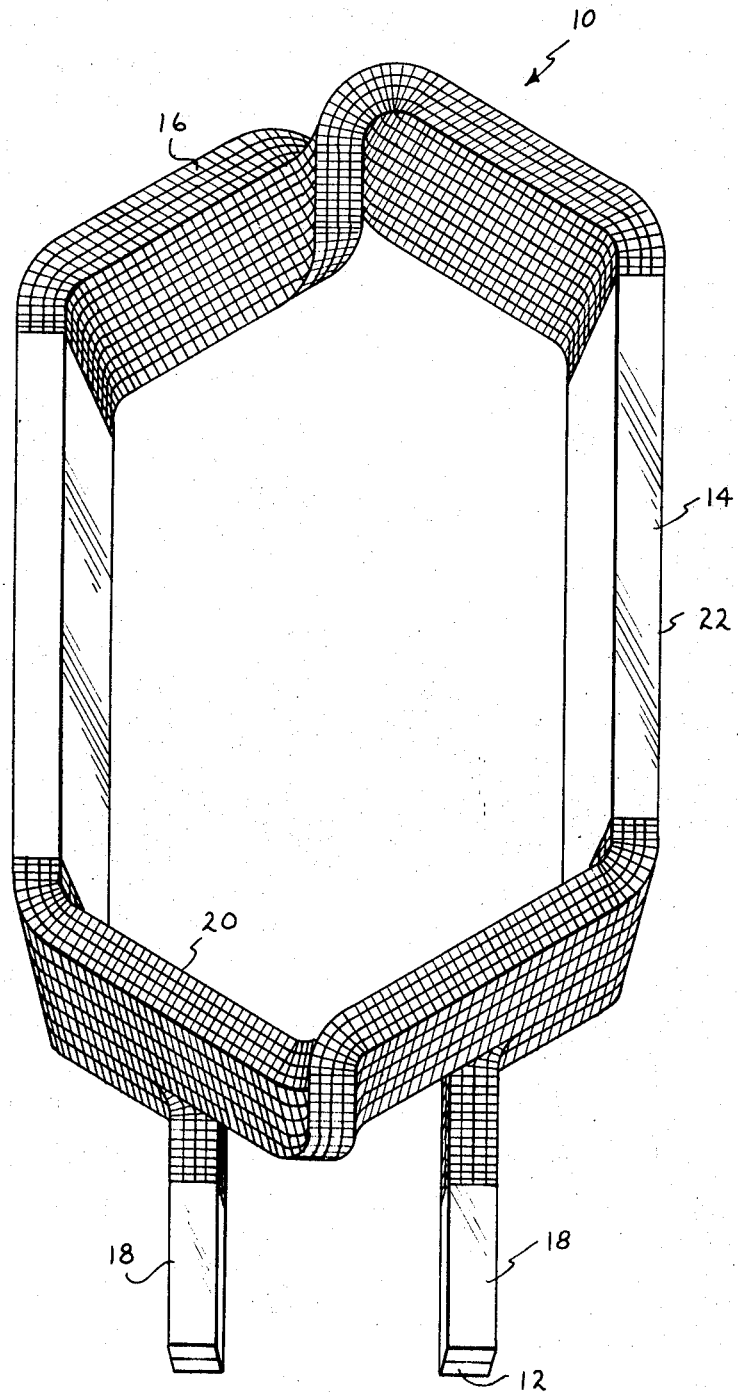

United States Patent [19]
Lenz

[11] 3,749,950
[45] July 31, 1973

[54] DYNAMOELECTRIC MACHINE HAVING ENHANCED COOLING

[75] Inventor: Henry George Lenz, Scotia, N.Y.

[73] Assignee: General Electric Company

[22] Filed: May 23, 1972

[21] Appl. No.: 256,054

[52] U.S. Cl. .................... 310/45, 310/271, 310/58
[51] Int. Cl. ............................................ H02k 15/12
[58] Field of Search ................. 310/64, 54, 58, 65, 310/45, 259, 179, 270, 215, 271; 174/120, 121; 336/206

[56] References Cited
UNITED STATES PATENTS

| | | | |
|---|---|---|---|
| R26,776 | 1/1970 | Anderson | 310/64 |
| 3,483,413 | 12/1969 | Logan | 310/271 |
| 3,574,325 | 4/1971 | Agarwal | 310/54 |
| 3,388,559 | 6/1968 | Johnson | 310/54 |
| 3,479,541 | 11/1969 | Robinson | 310/54 |
| 3,254,150 | 5/1966 | Rogers | 310/45 |
| 3,388,458 | 6/1968 | Logan | 310/270 |
| 3,079,519 | 2/1963 | Kitson | 310/45 |

Primary Examiner—R. Skudy
Attorney—Vale P. Myles et al.

[57] ABSTRACT

A dynamoelectric machine having preformed-coil winding conductors which are wrapped with an open weave tape that affords direct contact between liquid refrigerant circulating through the machine and the end turn portions of the conductors forming the coils. The slot portions of the winding coils preferably are wrapped with a solid dielectric tape to maximize thermal contact between the coil sides and adjacent magnetic laminations of the machiner stator.

11 Claims, 5 Drawing Figures

DYNAMOELECTRIC MACHINE HAVING ENHANCED COOLING

This invention relates to dynamoelectric machines and, in particular, to dynamoelectric machines having a winding of preformed coils wherein at least the end turn regions of the coils are wrapped with an open weave tape to maximize contact between the conductors forming the coils and the coolant circulated through the machine.

In the manufacture of dynamoelectric machines, there are two basically different techniques employed to form the machine windings dependent primarily upon such factors as the rated output and rated voltage of the machine. In a typical example of the first winding technique, a plurality of relatively flexible conductors extend down a stator slot in a first axial direction and return through another slot in the opposite direction to form a coil having a predetermined number of conductor turns. While the multiturn coils so formed may be a compact bundle of conductors, the coils are readily deformable since relative movement between conductors is restrained chiefly only by surface friction between adjacent conductors and the stiffness of the conductors. The conductors in such windings are typically formed of magnet wire, i.e., round copper or aluminum wires having a thin resinous film and/or serving of insulating material thereon, and the end turns are customarily tied together without segregation of individual turns in a phase group. The end turns then typically are varnish treated to bind the end turns into a compact unit. The machines having winding in accordance with this first technique are oftentimes characterized as "random" or "mush" wound machines and low horsepower machine windings are made using this first technique because it is a relatively simple and inexpensive procedure. Moreover, because there is no significant external wrapping upon the coil, coolant circulated through the machine can directly contact the surface conductors forming the end turns of the windings.

In the second winding technique, typically utilized above the low integral horsepower range because of mechanical or dielectric requirements, the coils are preformed prior to insertion in the core slots and the machines so constructed are typically characterized as "form" wound machines. The conductors in the typical form wound coils normally are rectangular strips of copper or aluminum which are wound in the desired number of turns and subsequently covered with coil insulation (typically of fabric, micaceous material and/or resinous material) that binds the conductors together and restricts any relative motion therebetween. Moreover, after the preformed coils are pulled into their final form for insertion in the core slots, insulation requirements often demand that the formed coil be impregnated with a resinous material which is thereafter hardened. Thus, the form wound, or preformed, coil is a rigid structure relative to the random wound coil which does not employ such coil insulation. The end turns of adjacent form wound coils, however, are spaced apart from each other in the end turn regions as they are secured to a suitable mechanical support ring. While the spaced apart disposition of the coil end turns significantly diminishes the span from the center of the coil copper to the surface of the coil (relative to random wound coils wherein the end turns of adjacent coils are all comingled), conventional preformed coils are not considered to have good heat transfer characteristics because of the lack of direct contact between the coil and the coolant customarily circulated through the machine to remove the heat generated by the machine.

It is therefore an object of this invention to provide a dynamoelectric machine having superior thermal transfer characteristics.

It is also an object of this invention to provide a dynamoelectric machine having physical separation between the end windings to reduce the thermal resistance of the end windings while not significantly impeding thermal contact between the circulating coolant and the electrical conductors forming the winding.

It is a further object of this invention to provide a dynamoelectric machine having a coil winding specifically adapted for maximum thermal transfer in a hermetic machine wherein a liquid refrigerant is circulated through axial passages adjacent the coil slots of the machine.

It is a still further object of this invention to provide a dynamoelectric machine wound with preformed coils having the mechanical strength and dielectric characteristics of a low voltage form wound system but superior heat transfer characteristics over either the conventional form, or random, wound systems.

These and other objects of this invention generally are accomplished in a dynamoelectric machine by utilizing a preformed coil winding (to provide the desirable physical separation between the end turns of adjacent coils) and enclosing the end turn regions of the preformed coils with an open weave covering to permit substantially unimpeded contact between the circulating coolant and the underlying conductors. Thus, a dynamoelectric machine in accordance with this invention would include a magnetizable member, e.g., typically a conventional stator, having a plurality of circumferentially spaced, axially extending slots opening into a substantially cylindrical surface to receive the sides of the preformed coils forming the machine winding. At least the end turn regions of the preformed coils, however, are enclosed with an electrically insulating covering having a weave sufficiently open to permit substantially unobstructed flow of coolant through the covering to contact the underlying electrical conductors forming the coil. An electrically insulating adhesive, such as an epoxy resin or varnish, having a thickness upon curing less than the thickness of the insulating covering normally is applied over the entire coil to additionally insulate the coil and provide mechanical strength to the structure. Preferably, the covering for the end turns is a non-hydroscopic tape, such as a polyester tape, and the tape is wrapped upon the end turns in a butt lap to maximize the contact between the circulating coolant and the underlying conductors forming the coil.

Figure 2:
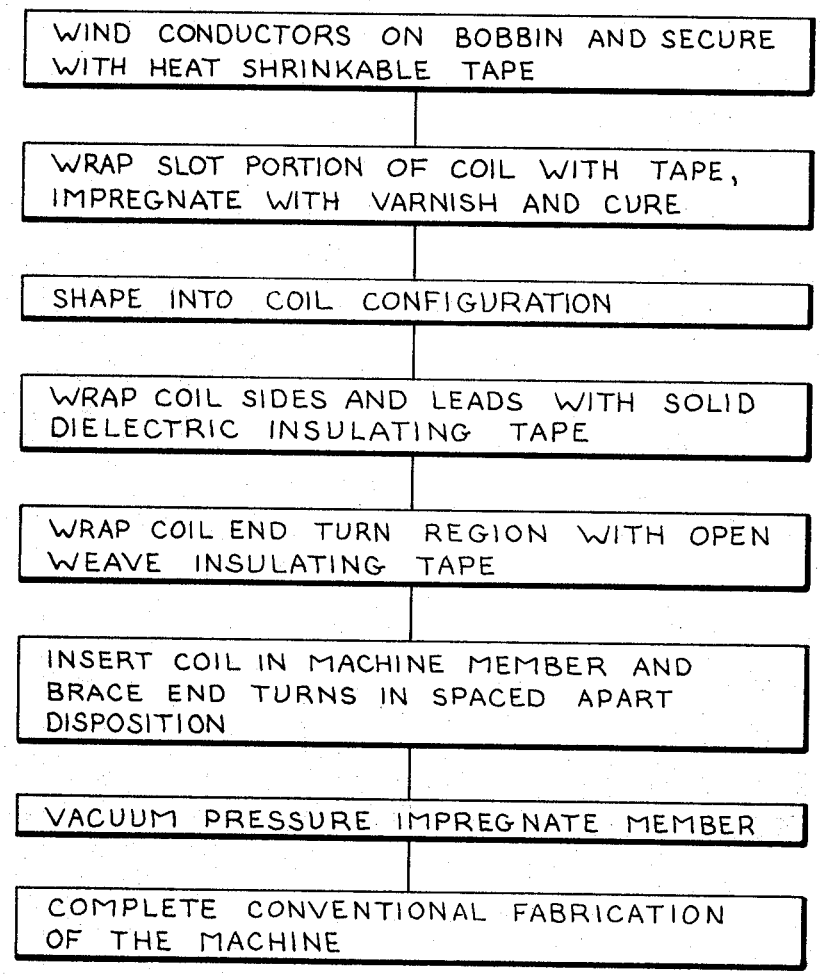
Figure 3:
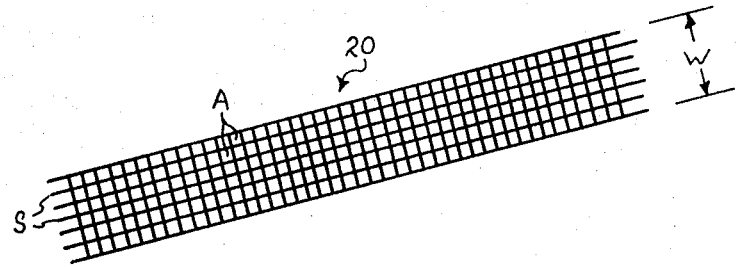
Figure 4:
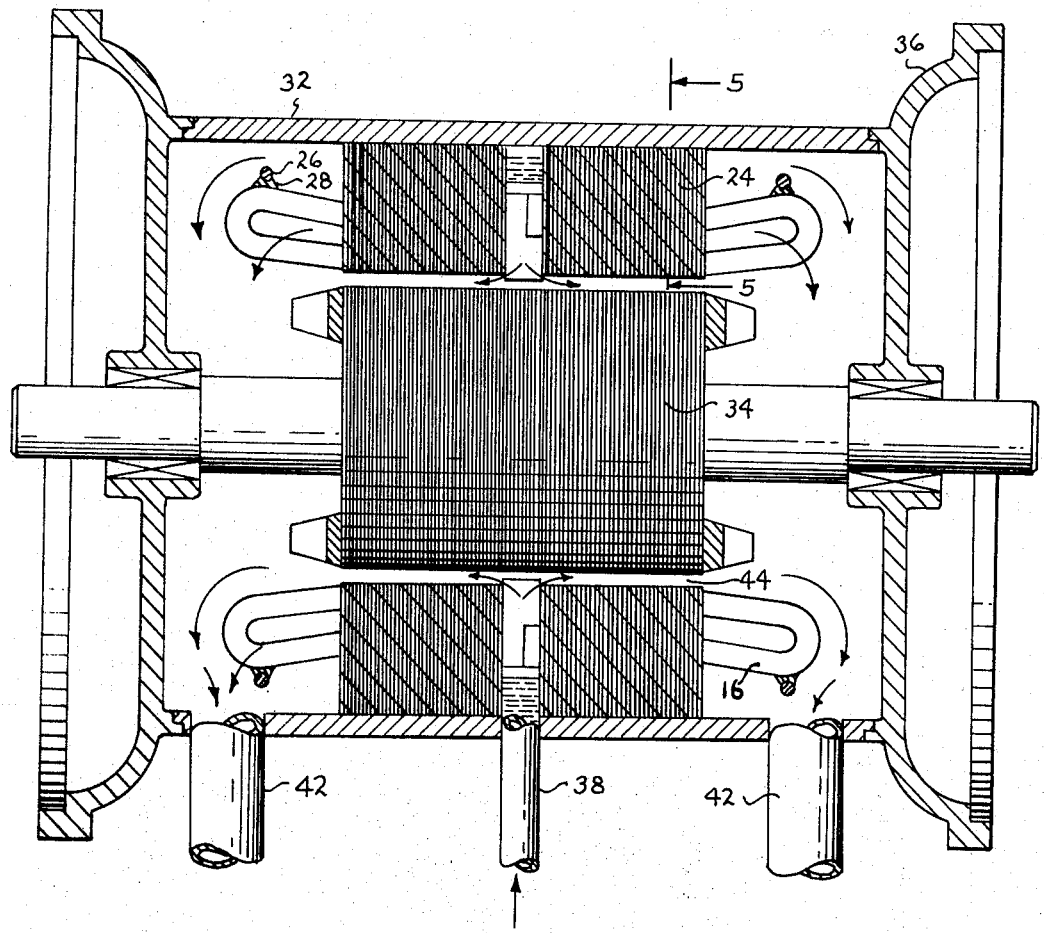
Figure 5:
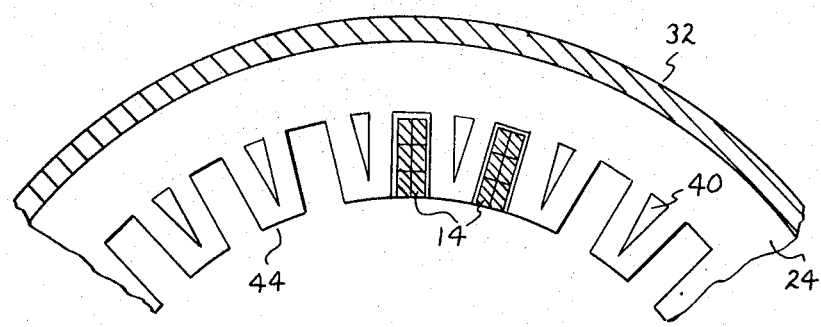

Although this invention is described with particularity in the appended claims, a more complete understanding of the invention may be obtained from the following detailed description of a specific embodiment of the invention when taken in conjunction with the appended drawings wherein:

FIG. 1 is an isometric view of a preformed coil formed in accordance with this invention, FIG. 2 is a flow chart depicting the preferred method for forming the coil of FIG. 1, FIG. 3 is an enlarged view of a perforated tape preferably utilized to wrap the end turns of the coil, FIG. 4 is a sectional view of a hermetic motor formed in accordance with this invention, and FIG. 5 is a sectional view taken along lines 5—5 in FIG. 4.

A preformed coil 10 in accordance with this invention is illustrated in FIG. 1 and generally is formed of a plurality of turns of an insulated conductor 12 shaped into a coil configuration, i.e., shaped utilizing conventional coil forming machinery into a coil having elongated coil sides 14 for insertion within axial slots in a magnetic member of a dynamoelectric machine and angularly extending end turn regions 16 interconnecting the coil sides. The end turn regions, in conventional fashion, are dimensioned and have an angular disposition to permit positioning of the coil sides within the desired slots in the magnetic member to produce a winding of the desired coil pitch and the coil is provided with leads 18 to enable the coils to be serially connected (or connected to a source of energization) to produce the desired rotating electromagnetic field in the machine. The coil is completely wrapped with an exterior electrically insulating tape in preformed coil fashion. The tape 20 upon the end turn regions of the coil, however, has an open weave to permit substantially unimpeded contact between the underlying conductors and the coolant circulated throughout the machine. Because coil sides 14 are not in direct thermal communication with the circulating coolant (as will be more fully explained with reference to FIGS. 4 and 5), the tape wrapped around the coil sides preferably is a conventional solid dielectric electrically insulating tape 22 to maximize the thermal contact between the coil sides and the magnetic laminations wherein the coil is positioned. As used herein, the term "solid dielectric tape" is defined as a tape impervious to liquid refrigerant along the length of the tape (thereby assuring good thermal contact from the conductors through the tape to the magnetic structure adjacent the coil sides). The term "open weave tape," on the other hand, is defined as a tape allowing ready penetration of liquid refrigerant through the tape to the underlying conductors. Typically, the solid dielectric tape is characterized by a material to void ratio in excess of 3 to 1 for a given cross-sectional area after wrapping upon the coil while the " open weave" tape would have a material to void ratio less than 1 to 3. The whole coil is coated with an electrical adhesive (not shown), i.e., a varnish or an epoxy resin, to mechanically bind and electrically insulate the coil.

Conductors 12 utilized to form the performed coil typically are conventional varnish coated copper or aluminum wires of rectangular configuration to maximize the volume of conductive material positionable in the coil slots. To form coil 10, as shown in the flow chart in FIG. 2, the rectangular conductors typically are wound on a bobbin (not shown) in a number of turns desired for a coil side and the wire is secured into position with a heat shrinkable tape, such as Mylar tape Coil sides 14 then are wrapped with a single butt lap of insulating tape 22 conventionally utilized for form wound coils. Typically, this tape may be a glass tape having a close weave to maximize contact between the coil sides and the adjacent magnetic laminations and the coil sides are dipped in a suitable varnish, or epoxy resin, for a period of time sufficient to enable the varnish to penetrate into the pores of the tape. The structure then is baked, e.g., at 90° for 30 minutes, to cure the varnish and securely lock the coil sides in position. After the structure is shaped to the desired coil configuration to produce a coil pitch equal to the pitch desired for the number of electrical poles in the finished machine, the slot portions of the coil are overtapped with a suitable solid dielectric insulation, such as Mica Mat, Lector glass or Normex insulating tapes. Preferably, the tape on coil sides 14 should extend approximately one inch into end turn regions 16 of the coil to assure adequate insulation upon the portion of the coil within the machine slots.

In accordance with this invention, the end turn regions are wrapped with an open weave non-hydroscopic tape 20 (illustrated in FIG. 3) to permit substantially uninhibited contact between the refrigerant to be circulated through the machine and the copper conductors underlying the open weave wrapping upon the end turns. The end turn tape preferably is greater than 0.3 inch wide to maximize the size of the apertures within the tape and typically is formed of a polyester, or a polyester containing glass fibers, to provide the abrasion resistance, the high temperature rating to transient heating and the compatibility with the circulating refrigerant desired for the tape. To maximize the thermal transfer between the refrigerant and the end turn regions, tape 20 also should have an open weave to permit substantially unimpeded penetration of the refrigerant through the tape to directly contact the underlying insulated conductors forming the coil. To accomplish this result, the apertures A of the tape preferably should be greater than the size of a sieve permitting ready flow of refrigerant therethrough and in general, each aperture should be at least 0.003 sq. inches in area. The strands of the tape also should be at least 10 mils thick to provide mechanical strength for the tape and physical separation between conductors of adjacent coils should the coils touch together.

The width W of tape 20 preferably is between ¾ and 1¼ inch to facilitate handling of the tape and to maximize the size of the apertures in the tape without excessive fraying of the tape. A leno weave tape is preferred to lock the warp and fill threads of the tape so that the size of the openings cannot change during the manufacturing operations. It will be appreciated that other locking weaves can be utilized to secure at least one, i.e., either the warp or fill, thread in relatively fixed location along the tape. The tape also should be butt lapped upon the end turn regions to inhibit reduction in the size of the tape apertures by overlying one layer of tape upon another. In general, the size of the apertures utilized within the tape should be the maximum permissible size without excess fraying of the tape and the span between adjacent strands of the open weave tape typically is greater than 0.05 inches. The solid material forming open weave tape 20 also should not be large enough in any dimension to thermally insulate a significant portion of the coil.

After complete wrapping of the coil with the diverse tapes, i.e., wrapping of the coil sides and leads with a solid dielectric insulating tape and wrapping of the end turn regions with the open weave insulating tape, the individual coils are positioned within the slots in stator 24 (illustrated in FIG. 4) and secured in position utilizing a vibration absorbing material, such as felt pads (not shown) glued between the arms of adjacent end turns. Conventional coil bracing techniques, e.g., the tieless bracing system described in Fortenbach U.S.

Pat. No. 3,320,452, issued Sept. 23, 1963 and assigned to the assignee of the present invention, then can be employed to secure the end turns to support ring 26.

After the individual coils are connected and the connections are wrapped with an insulating tape of known design, the wound core is vacuum pressure impregnated with a resin in conventional fashion, i.e., the core is baked to an elevated temperature of approximately 150° C whereafter the core is positioned within a vacuum chamber and, after evacuation of the chamber, an electrically insulating resin is admitted to the chamber to cover the entire winding. The chamber then is pressurized to permeate the resin through the insulating tapes and, after removal of the core from the resin bath, the core is baked to cure the resin insulation. The viscosity and surface tension of the liquid resin thus permits the resin to penetrate through the open weave tape into contact with the underlying conductors during the vacuum pressure impregnation treatment while drainage of the resin from the core produces a resin thickness on the end turn regions substantially less than the thickness of the strands forming the open weave tape to minimize the thermal barrier on the coil conductors. After the vacuum pressure impregnation of the stator core has been completed, the core is positioned within a suitable frame 32 and rotor 34 is positioned axially therein. The end shields 36 next are mounted upon the motor to fully enclose the structure. It will be appreciated, however, that the coil insulation of this invention can be utilized without a vacuum pressure impregnation treatment.

During operation of the motor, liquid refrigerant is admitted to the motor, e.g., through tubing 38, and the refrigerant flows through axial passages, such as the triangular slots 40 and air gap 44 (illustrated in FIG. 5) extending through the stator to cool the side of the windings by conduction from coil sides 14 through the magnetic laminations to the circulating refrigerant. At the ends of the stator laminations, the refrigerant passes between the end turns of the motor to cool end turn regions 16 before exhaust through conduits 42 at opposite ends of the motor. Because of the open weave taping upon the end turn regions permitting penetration of the refrigerant therethrough and the spacing between the end turn regions of adjacent coils (because of the preformed coil design of the windings), thermal transfer between the end turn regions and the refrigerant is maximized. A preferred stator structure to accomplish this result is disclosed in my copending patent application Ser. No. 103,497, and filed Jan. 4, 1971 (the entire disclosure of which application is incorporated herein). It will be appreciated, however, that axial passages through the stator of any physical configuration, or air gap 44 between the rotor and the stator alone, may be utilized to cool the coil sides.

Because the end turn regions of the coils are cooled by direct application of the refrigerant thereto while the coil sides are cooled by conduction through the stator laminations, optimum cooling of the coils is achieved when only the end turn regions of the coils are wrapped with an open weave tape and the coil sides are wrapped with a solid dielectric tape. It will be appreciated, however, that if the axial passages for cooling the coil sides permit passage of liquid refrigerant in direct contact with the coil sides, the entire coil could be wrapped with open weave insulating tape 20. Such a coil wrapping design, however, generally is not preferred because of the reduced dielectric strength between the coil sides and the adjacent magnetic laminations.

What I claim as new and desire to secure by Letters Patent of the United States is:

1. A dynamoelectric machine having thermal transfer characteristics comprising:
   a. a magnetizable member having a substantially cylindrical surface,
   b. a plurality of axially extending slots circumferentially spaced in said member and opening into said cylindrical surface,
   c. a conductive winding in said member formed of a plurality of preformed coils, the sides of said coils being situated in said slots and the end turn regions of said coils extending axially from opposite ends of said magnetizable member,
   d. at least the end turn regions of said coils being wrapped with open weave tape to permit substantially unobstructed flow of coolant between strands of said tape to contact the underlying electrical conductors forming said coils.

2. A dynamoelectric machine according to claim 1 wherein said open weave tape is formed by a lock weave to secure at least one thread in relatively fixed location along the tape.

3. A dynamoelectric machine according to claim 2 further including an electrically insulating adhesive coated atop said taped end turn regions, said adhesive having a thickness upon curing less than the thickness of the fibers forming said tape and having an initial viscosity and surface tension upon application to said coils to penetrate through said open weave tape into contact with the underlying conductors.

4. A dynamoelectric machine according to claim 3 wherein said tape has a width in excess of 0.3 inches and the longitudinal strands of said tape are separated by a span greater than 0.05 inches.

5. A dynamoelectric machine according to claim 4 wherein said open weave tape is wound upon said end turn regions in a butt lap.

6. A dynamoelectric machine having thermal transfer characteristics comprising:
   a. a magnetizable member having a substantially cylindrical surface,
   b. a plurality of axially extending slots circumferentially spaced in said member and opening into said cylindrical surface,
   c. a conductive winding in said member formed of a plurality of preformed coils, each said preformed coil including a plurality of insulated conductors shaped into a geometric configuration permitting said coil to be positioned within predetermined circumferentially spaced slots and an insulating covering atop said conductors to maintain said conductors in relatively fixed position relative to each other,
   d. means for circulating a fluid coolant through said machine to cool said machine, and
   e. the portion of said insulating covering upon the sides of said coils situated within said slots having a weave substantially impervious to said circulating coolant and the portion of said insulating covering upon the end turn regions situated outside said magnetizable member having an open weave to permit substantially unobstructed contact between said coolant and said conductors underlying said insulating covering.

7. A dynamoelectric machine according to claim 6 wherein said fluid refrigerant is a liquid and said covering upon said end turn regions is a lock weave tape of non-hydroscopic material.

8. A dynamoelectric machine according to claim 7 further including an electrically insulating adhesive oVerlying said stranded tape and contacting said underlying conductors, the thickness of said adhesive upon curing being substantially less than the thickness of the strands forming said tape.

9. A dynamoelectric machine having thermal transfer characteristics comprising:
  a. a magnetizable member having a substantially cylindrical surface,
  b. a plurality of axially extending slots circumferentially spaced in said member and opening into said cylindrical surface,
  c. a conductive winding in said member formed of a plurality of preformed coils, the sides of said coils being situated in said slots and the end turn regions of said coils extending axially from said magnetizable member,
  d. means for circulating a liquid refrigerant through said machine to cool said machine windings, said circulating means including means for passing said liquid refrigerant into direct contact with said end turn regions of said conductive windings,
  e. an open weave electrical insulating covering said end turn regions and mechanically securing the conductors forming an individual coil into separate, spaced apart groups, said open weave insulation having a weave locking at least one thread in relatively fixed location along the tape to provide a plurality of openings therein in excess of 0.03 sq. inch permitting substantially unobstructed contact between said refrigerant and said end turns,
  f. an electrical insulation covering the sides of said end turns disposed within the slots of said machine, said electrical insulation being a solid dielectric substantially impervious to the liquid refrigerant flowing through said machine, and
  g. means for directing said refrigerant through axial passages in said magnetizable member to cool the sides of said coils by conduction of heat from said coil sides through the magnetic member to said flowing refrigerant.

10. A dynamoelectric machine according to claim 9 wherein said open weave electrical insulation is a polyester tape having a width greater than 0.3 inches.

11. A dynamoelectric machine according to claim 10 wherein said polyester tape is butt lapped around said end turn regions and further including an electrically insulating adhesive coated thereon, said adhesive having a viscosity upon application to said tape sufficient to permit penetration of said adhesive through the tape into direct contact with the underlying conductors, the thickness of said adhesive upon curing being less than the thickness of said tape to maximize thermal contact between said refrigerant and said conductors forming said preformed coil.

* * * * *